Figure 1:
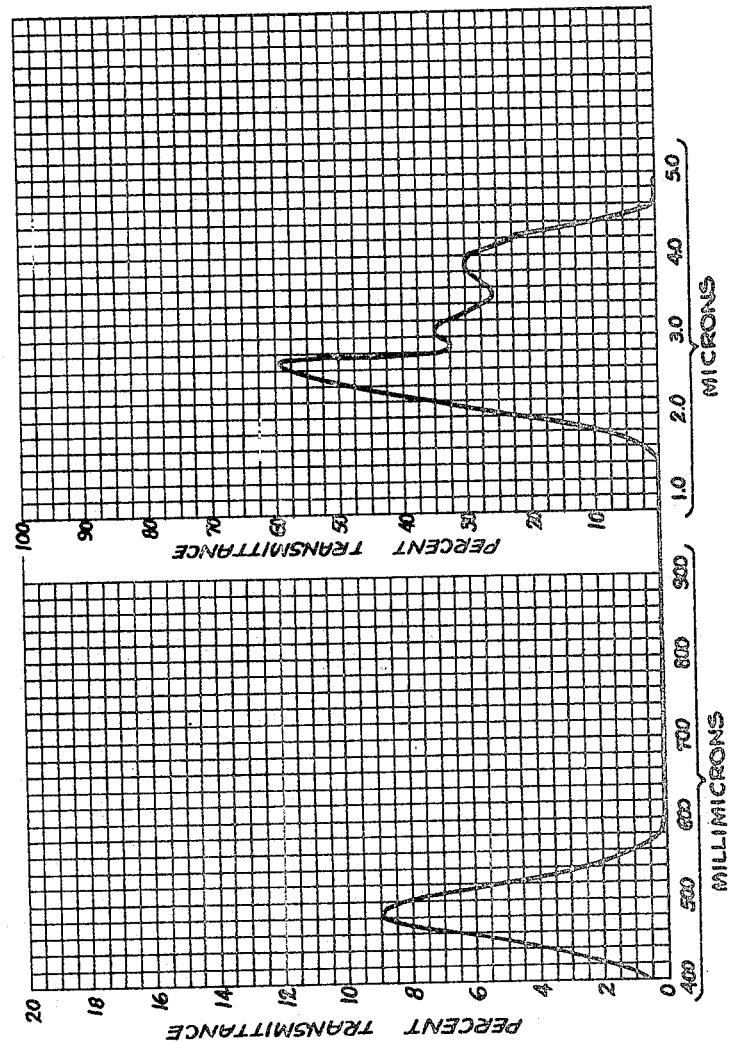

3,146,120
ABSORPTIVE GLASSES
Lee O. Upton, Sturbridge, Mass., and Robert W. Young, Woodstock, Conn., assignors to American Optical Company, Southbridge, Mass., a corporation of Massachusetts
Filed Jan. 11, 1962, Ser. No. 168,304
16 Claims. (Cl. 117—33.3)

This invention relates to an improved glass composition and method of making the same for use in forming welding plates or similar articles, wherein the absorptive characteristics of the glass in the visible region of the spectrum is selectively controlled while simultaneously absorbing in the ultra-violet and near infra-red portions of the spectrum in accordance with the resultant characteristics desired of said plates or similar articles.

This application comprises a continuation-in-part of our earlier-filed, copending application Serial No. 738,429, filed May 28, 1958, now abandoned.

A principal object of the invention is to provide an inexpensive glass of the above character which is chemically stable particularly as to moisture attack at high humidity and high temperature and which is particularly stable to devitrification and method of making the same.

Another object is to provide a glass of the above character whose composition may be varied to produce glasses of different shades ranging from approximately 5.3 to approximately 12.5 and whose transmittance in the visible part of the spectrum will peak between 480 and 490 millimicrons and more desirably at 485 millimicrons and which has substantially no transmittance in wavelengths shorter than 400 millimicrons.

Another object is to provide glass compositions of shades varying from 5.3 to 12.5 having thicknesses of approximately 3 mm. which contain:

| | Percent by weight |
|---|---|
| Silica, $SiO_2$ | From 52.2 to 72.5 |
| Sodium oxide, $Na_2O$ | From 0 to 16.0 |
| Potassium oxide, $K_2O$ | From 0 to 16.0 |
| Calcium oxide, CaO | From 6.4 to 13.7 |
| Arsenic trioxide, $As_2O_3$, and/or antimony trioxide, $Sb_2O_3$ | From 0.5 to 1.0 |
| Titanium dioxide, $TiO_2$ | From 0 to 2.0 |
| Copper oxide, CuO | From 5.0 to 9.5 |
| Cobalt oxide, $Co_2O_3$ | From 0.015 to 0.20 | wherein the $TiO_2$ content may be varied in accordance with the viscosity desired of the final melt, and the $Na_2O$ may be entirely or partially replaced by $K_2O$ with the sum of $Na_2O$ and $K_2O$ equalling at least 12% of the total batch.

Another object is to provide glass compositions of shades between 5.3 and 12.5 for specimens of approximately 3 mm. thickness whose proportions of ingredients may be varied as follows:

| | Percent by weight |
|---|---|
| Silica, $SiO_2$ | From 52.2 to 72.5 |
| Sodium oxide, $Na_2O$ | From 0 to 16.0 |
| Potassium oxide, $K_2O$ | From 0 to 16.0 |
| Calcium oxide, CaO | From 6.4 to 13.7 |
| Arsenic trioxide, $As_2O_3$, and/or antimony trioxide, $Sb_2O_3$ | From 0.5 to 1.0 |
| Titanium dioxide, $TiO_2$ | From 0 to 2.0 |
| Copper oxide, CuO | From 5.0 to 9.5 |
| Cobalt oxide, $Co_2O_3$ | From 0.015 to 0.20 | wherein the $TiO_2$ content may be varied in accordance with the viscosity desired of the final melt, and wherein if the $Na_2O$ is substituted partially or wholly for $K_2O$ or vice versa, then the copper oxide and cobalt oxide must be adjusted accordingly to maintain the desired wavelength and peak transmittance.

Another object is to provide glasses resulting from the above compositions having a metallic coating preferably of gold applied to a side surface thereof which is to be the front surface of the resultant article for the purpose of reflecting and thereby rejecting harmful infra-red radiations and which glasses will peak at substantially the same wavelength as does the gold coating and which gold coating introduces only a negligible, if any, shift in the wavelength of the composite structure.

Other objects and advantages of the invention will become apparent from the following description taken in connection with the accompanying drawings. It is to be understood that the description as set forth herein is not to be taken in any limited sense but more as illustrative as to how the invention may be practiced within the limits as defined by the accompanying claims.

Referring to the drawings:

FIG. 1 of the drawings shows a face view of a chart diagrammatically illustrating the transmittance curve in the visible and infra-red regions of the spectrum of a 5.3 shade glass having a thickness of 3 mm. resulting from batches which will hereinafter be defined as batches A, B, C, D, M and Q and from a glass whose chemical analysis will be hereinafter referred to as B'.

Figure 2:
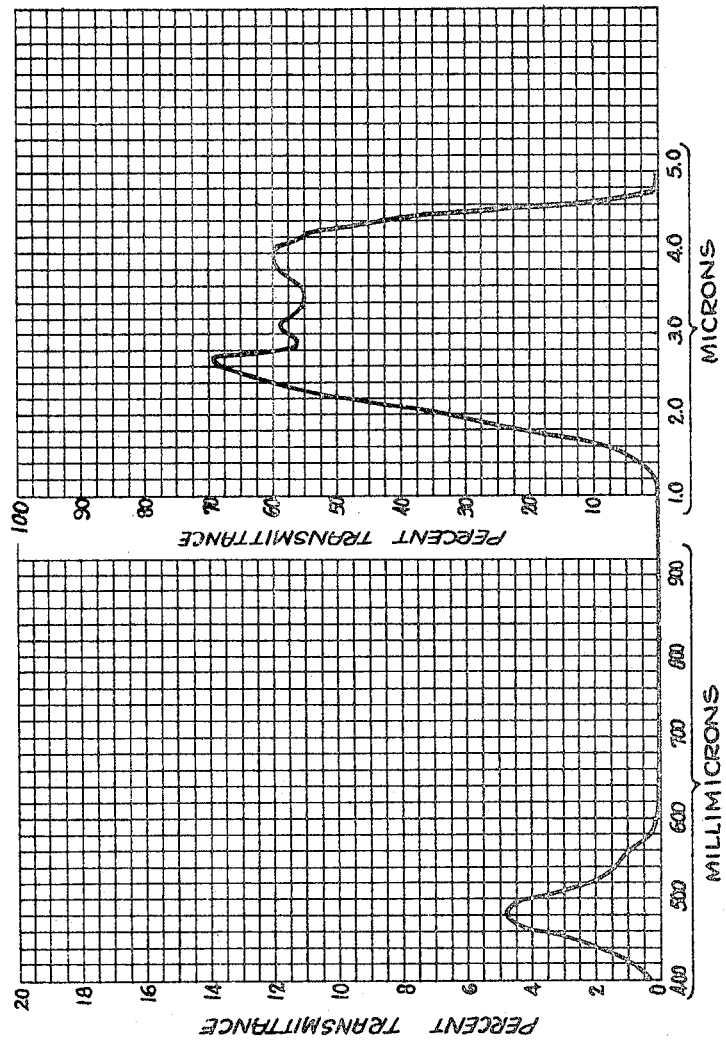

FIG. 2 of the drawings shows a face view of a chart diagrammatically illustrating the transmittance curve in the visible and infra-red regions of the spectrum of a glass which with a thickness of 3 mm. is of 12.5 shade but for purposes of measurement has been reduced to a thickness of approximately 1 mm. resulting from batches which will hereinafter be defined as batches E, F, G, H, P and T and from a glass whose chemical analysis will be hereinafter referred to as F'.

Figure 3:
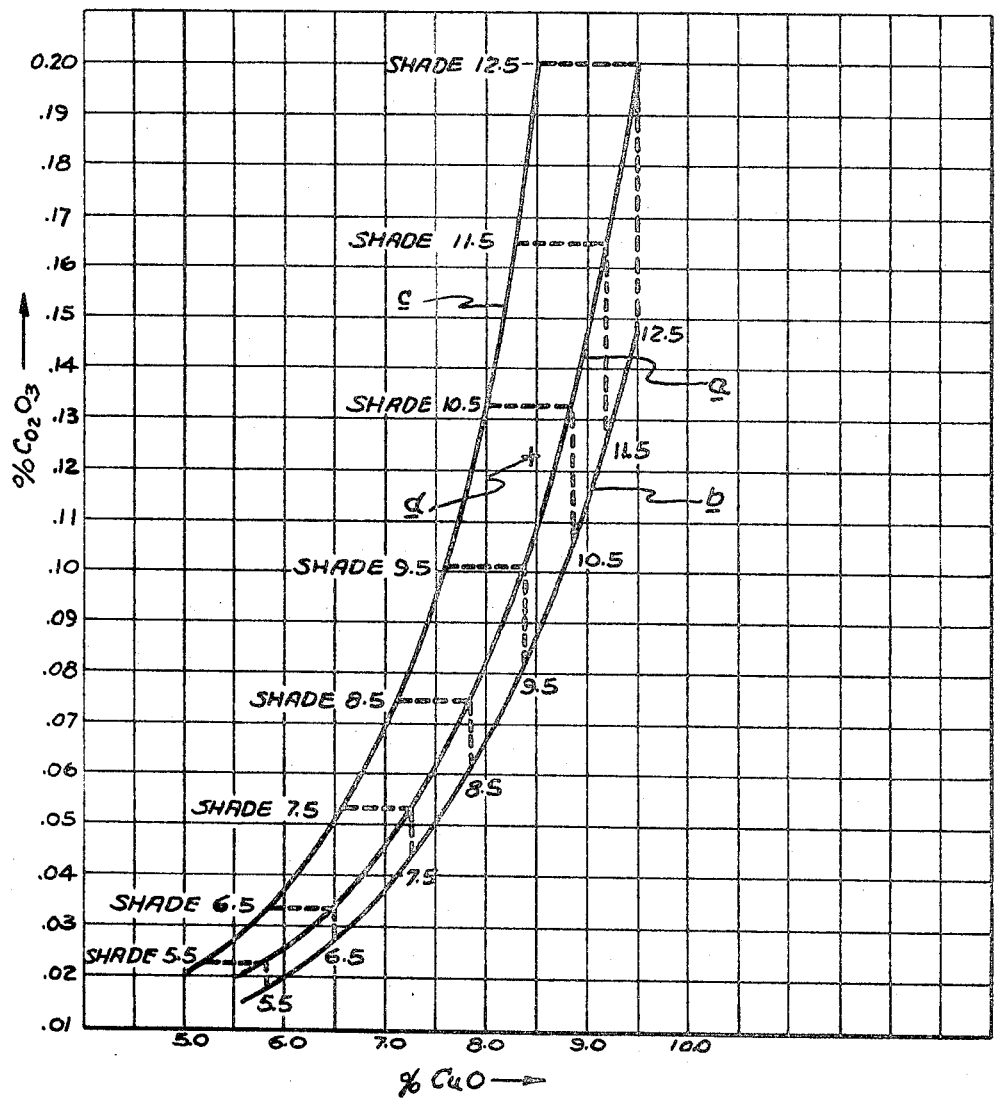

FIG. 3 of the drawings shows a face view of a chart diagrammatically illustrating the relative proportions of certain constituents of the glass compositions provided by this invention.

It has been found with known prior art welding plates, particularly those commonly used by welders utilizing helium or argon gas shielded arcs in welding aluminum, magnesium and other materials and for viewing the work for long sustained periods of time during said welding that the welder's eyes became irritated. This condition prevailed even when using certain prior art protective glasses several shades deeper than indicated necessary for the amperage and visible radiations of the welding arcs used. Welders also complained of a yellow flare light present in the arc or a blue haze or mist surrounding the work which obstructed the view of the wearer during the welding operations.

It, therefore, is a primary object of this invention to improve upon and overcome the above problems through the provision of an improved glass and method of making the same whose peak transmittance is substantially at 485 millimicrons and which is designed particularly for use in combination with a thin metallic coating, preferably gold, placed on a side surface of said glass and which is adapted to function cooperatively therewith in introducing the infra-red absorptive charcteristics desired while eliminating the blue haze and yellow flare mentioned above, as well as providing a clearer view of the work with much greater comfort to the wearer after prolonged use of the welding equipment. The invention is further directed to the provision of glases of the above character which are particularly durable and stable from a chemical point of view, that is, to chemical attack and to moisture attack at high humidity and high temperature.

The glass compositions provided by this invention embody silica, $SiO_2$, as their major ingredient. The preferred range of shades from 5.3 to 12.5 for specimens of the glass compositions having a thickness of approximately 3 mm. can be obtained from batch compositions which include constituents in quantities within the following ranges:

|  | Percent by weight |
| --- | --- |
| Silica, $SiO_2$ | From 52.2 to 72.5 |
| Sodium oxide, $Na_2O$ | From 0 to 16.0 |
| Potassium oxide, $K_2O$ | From 0 to 16.0 |
| Calcium oxide, CaO | From 6.4 to 13.7 |
| Arsenic trioxide, $As_2O_3$ | From 0 to 1.0 |
| Antimony trioxide, $Sb_2O_3$ | From 0 to 1.0 |
| Titanium dioxide, $TiO_2$ | From 0 to 2.0 |
| Copper oxide, CuO | From 5.0 to 9.5 |
| Cobalt oxide, $Co_2O_3$ | From 0.015 to 0.20 | wherein the $TiO_2$ content may be varied in accordance with the viscosity desired of the final melt, wherein the $As_2O_3$ content may be partially or wholly replaced by $Sb_2O_3$ with a combined content of $As_2O_3$ and $Sb_2O_3$ equalling between 0.5 and 1.0 percent by weight, and wherein the $Na_2O$ content may be partially or wholly replaced by $K_2O$ with a combined content of $Na_2O$ and $K_2O$ equalling at least 12 percent by weight.

The quantities of $As_2O_3$ and/or $Sb_2O_3$ are included in the compositions within the specified ranges for aiding in fining the glass melts as will be understood.

The quantities of the alkalis $Na_2O$ and $K_2O$ employed in forming the glass compositions can be varied within the above-noted ranges in conventional manner in accordance with the function of the alkalis as fluxes, the relative proportions of the respective alkalis being selected in accordance with their cost, availability etc. in conventional manner. Further, the quantities of the colorants CuO and $Co_2O_3$ employed can be varied for providing glasses of shades between 5.3 and 12.5 having the desired transmissive and absorptive properties set forth above. However, it has been found that the quantities of the colorants CuO and $Co_2O_3$ which will be required for forming a glass of a selected shade having the desired transmissive properties will depend upon the relative proportions of the alkalis $Na_2O$ and $K_2O$ embodied in the glass, the quantities of said colorants required for glass compositions embodying alkalis $Na_2O$ and $K_2O$ in different relative proportions being in accordance with the graph illustrated in FIG. 3.

Thus, where the $Na_2O$ content and the $K_2O$ content of compositions are in ratio equalling 0.962, the preferred range of shades from 5.3 to 12.5 for specimens of the compositions having a thickness of approximately 3 mm. can be obtained from batches which include constituents within the following ranges:

|  | Percent by weight |
| --- | --- |
| Silica, $SiO_2$ | From 52.26 to 71.59 |
| Sodium oxide, $Na_2O$ | From 6.30 to 11.95 |
| Potassium oxide, $K_2O$ | From 6.55 to 12.42 |
| Calcium oxide, CaO | From 6.43 to 13.70 |
| Titanium dioxide, $TiO_2$ | From 0 to 1.90 |
| Arsenic trioxide, $As_2O_3$, and/or antimony trioxide, $Sb_2O_3$ | From 0.54 to 0.66 |
| Copper oxide, CuO | From 5.55 to 9.48 |
| Cobalt oxide, $Co_2O_3$ | From 0.02 to 0.20 |

The quantities of the alkalis and other constituents embodied in these compositions can be varied within the prescribed ranges but the relative proportions of the respective alkalis $Na_2O$ and $K_2O$ are to be maintained constant in a ratio equalling 0.962 so that 49 percent of the total alkali content of each composition comprises $Na_2O$ and so that 51 percent of said alkali content comprises $K_2O$. In these compositions, the quantities of the colorants CuO and $Co_2O_3$ required for obtaining the desired shades from 5.3 to 12.5 vary in accordance with curve $a$ in FIG. 3.

Glass compositions for shades from 5.3 to 12.5 can be produced from the following batches in which, although the total alkali content is varied, 49 percent of said alkali content comprises $Na_2O$ and 51 percent of said alkali content comprises $K_2O$.

|  | A | B | C | D |
| --- | --- | --- | --- | --- |
| $SiO_2$ | 55.70 | 65.93 | 71.59 | 65.93 |
| $Na_2O$ | 11.95 | 7.87 | 7.72 | 7.87 |
| $K_2O$ | 12.42 | 8.18 | 8.03 | 8.18 |
| CaO | 13.7 | 11.79 | 6.43 | 9.89 |
| $TiO_2$ |  |  |  | 1.90 |
| $As_2O_3$ and/or $Sb_2O_3$ | 0.66 | 0.66 | 0.66 | 0.66 |
| CuO | 5.55 | 5.55 | 5.55 | 5.55 |
| $Co_2O_3$ | 0.02 | 0.02 | 0.02 | 0.02 |
|  | 100.00 | 100.00 | 100.00 | 100.00 |
| Shade | 5.3 | 5.3 | 5.3 | 5.3 |

|  | E | F | G | H |
| --- | --- | --- | --- | --- |
| $SiO_2$ | 52.26 | 63.07 | 70.32 | 63.07 |
| $Na_2O$ | 11.73 | 7.52 | 6.30 | 7.52 |
| $K_2O$ | 12.20 | 7.82 | 6.55 | 7.82 |
| CaO | 13.50 | 11.28 | 6.52 | 9.38 |
| $TiO_2$ |  |  |  | 1.90 |
| $As_2O_3$ and/or $Sb_2O_3$ | 0.63 | 0.63 | 0.63 | 0.63 |
| CuO | 9.48 | 9.48 | 9.48 | 9.48 |
| $Co_2O_3$ | 0.20 | 0.20 | 0.20 | 0.20 |
|  | 100.00 | 100.00 | 100.00 | 100.00 |
| Shade | 12.5 | 12.5 | 12.5 | 12.5 |

|  | I | J | K | L |
| --- | --- | --- | --- | --- |
| $SiO_2$ | 65.30 | 64.26 | 63.81 | 63.36 |
| $Na_2O$ | 7.80 | 7.67 | 7.62 | 7.56 |
| $K_2O$ | 8.12 | 7.99 | 7.93 | 7.88 |
| CaO | 11.68 | 11.49 | 11.41 | 11.33 |
| $TiO_2$ |  |  |  |  |
| $As_2O_3$ and/or $Sb_2O_3$ | 0.56 | 0.55 | 0.55 | 0.54 |
| CuO | 6.50 | 7.96 | 8.57 | 9.16 |
| $Co_2O_3$ | 0.03 | 0.08 | 0.11 | 0.13 |
|  | 99.99 | 99.99 | 99.99 | 99.99 |
| Shade | 6.5 | 8.7 | 9.9 | 11.3 |

It can be seen by comparison of batches A–D and by comparison of batches E–H that, although the quantities of the various constituents of the batches are varied within the prescribed ranges, the quantities of the colorants CuO and $Co_2O_3$ required for providing a glass composition of a particular shade remains constant provided that the relative proportions of the $Na_2O$ and $K_2O$ contents of the compositions also remains constant.

However, where the total alkali content of the glass compositions is made up entirely of $Na_2O$, the preferred range of shades from 5.3 to 12.5 for specimens of the compositions having a thickness of approximately 3 mm. can be obtained from batches which include constituents within the following ranges:

|  | Percent by weight |
| --- | --- |
| Silica, $SiO_2$ | From 70.00 to 71.80 |
| Sodium oxide, $Na_2O$ | From 12.85 to 15.75 |
| Potassium oxide, $K_2O$ | From ____ to ____ |
| Calcium oxide, CaO | From 6.43 to 8.97 |
| Titanium dioxide, $TiO_2$ | From ____ to ____ |
| Arsenic trioxide, $As_2O_3$, and/or antimony trioxide, $Sb_2O_3$ | From 0.63 to 0.66 |
| Copper oxide, CuO | From 5.50 to 9.48 |
| Cobalt oxide, $Co_2O_3$ | From 0.015 to 0.15 |

The quantities of the alkalis and other constituents embodied in these compositions can be varied within the prescribed ranges, but the total alkali content of compositions is to be made up entirely of $Na_2O$. In these compositions, the quantities of the colorants CuO and $Co_2O_3$ required for obtaining the desired shades from 5.3 to 12.5 vary in accordance with curve b in FIG. 3.

Glass compositions for shades 5.3 to 12.5 can be produced from the following batches in which, although the total alkali content is varied, the alkali content is made up entirely of $Na_2O$.

|  | M | N | O | P |
|---|---|---|---|---|
| $SiO_2$ | 71.80 | 70.00 | 70.00 | 70.37 |
| $Na_2O$ | 15.75 | 12.85 | 12.85 | 12.85 |
| $K_2O$ | | | | |
| CaO | 6.43 | 8.97 | 7.67 | 6.52 |
| $TiO_2$ | | | | |
| $As_2O_3$ and/or $Sb_2O_3$ | 0.66 | 0.63 | 0.63 | 0.63 |
| CuO | 5.50 | 7.50 | 8.95 | 9.48 |
| $Co_2O_3$ | 0.015 | 0.05 | 0.10 | 0.15 |
|  | 100.00 | 100.00 | 100.00 | 100.00 |
| Shade | 5.3 | 7.8 | 10.2 | 12.5 |

Conversely, where the total alkali content of the glass compositions is made up entirely of $K_2O$, the preferred range of shades from 5.3 to 12.5 for specimens of the compositions having a thickness of approximately 3 mm. can be obtained from batches which include constituents within the following ranges:

Percent by Weight
Silica, $SiO_2$ _____ From 70.00 to 72.14
Sodium oxide, $Na_2O$ _____ From ____ to ____
Potassium oxide, $K_2O$ _____ From 12.85 to 15.75
Calcium oxide, CaO _____ From 6.43 to 8.97
Titanium dioxide, $TiO_2$ _____ From ____ to ____
Arsenic trioxide, $As_2O_3$, and/or antimony trioxide, $Sb_2O_3$ _____ From 0.63 to 0.66
Copper oxide, CuO _____ From 5.00 to 8.50
Cobalt oxide, $Co_2O_3$ _____ From 0.02 to 0.20

The quantities of the alkalis and other constituents embodied in these compositions can be varied within the prescribed ranges, but the total alkali content of the compositions is to be made up entirely of $K_2O$. In these compositions, the quantities of the colorants CuO and $Co_2O_3$ required for obtaining the desired shades from 5.3 to 12.5 vary in accordance with curve c in FIG. 3.

Glass compositions for shades from 5.3 to 12.5 can be produced from the following batches in which, although the total alkali content is varied, the alkali content is made up entirely of $K_2O$.

|  | Q | R | S | T |
|---|---|---|---|---|
| $SiO_2$ | 72.14 | 70.00 | 70.00 | 71.30 |
| $Na_2O$ | | | | |
| $K_2O$ | 15.75 | 12.85 | 12.85 | 12.85 |
| CaO | 6.43 | 8.97 | 8.06 | 6.52 |
| $TiO_2$ | | | | |
| $As_2O_3$ and/or $Sb_2O_3$ | 0.66 | 0.63 | 0.63 | 0.63 |
| CuO | 5.00 | 7.50 | 8.30 | 8.50 |
| $Co_2O_3$ | 0.02 | 0.05 | 0.16 | 0.20 |
|  | 100.00 | 100.00 | 100.00 | 100.00 |
| Shade | 5.3 | 8.8 | 11.3 | 12.5 |

It can be seen from the graph of FIG. 3 that the quantities of colorants CuO and $Co_2O_3$ required for forming glass compositions of various shades can be selected by interpolation from the graph in accordance with the relative proportions of the alkalis $Na_2O$ and $K_2O$ which are to be embodied in the compositions. For example, if it is desired to produce a glass composition, a specimen of which having a thickness of approximately 3 mm. is to have a shade 10.2, and if the total alkali content of the composition is to embody 31 percent $Na_2O$ and 69 percent $K_2O$ (ratio equals 0.444), such a glass composition can embody constituents as set forth in the following batch:

Percent by weight
Silica, $SiO_2$ _____ 70.00
Sodium oxide, $Na_2O$ _____ 4.00
Potassium oxide, $K_2O$ _____ 9.00
Calcium oxide, CaO _____ 7.80
Titanium dioxide, $TiO_2$ _____ ____
Arsenic trioxide, $As_2O_3$, and/or antimony trioxide, $Sb_2O_3$ _____ 0.63
Copper oxide, CuO _____ 8.45
Cobalt oxide, $Co_2O_3$ _____ 0.123

This composition is indicated in the graph of FIG. 3 by the point d in accordance with the desired shade number and ratio of $Na_2O$ to $K_2O$ content, thereby indicating the quantities of the colorants CuO and $Co_2O_3$ embodied in the composition.

It can be seen from the batch compositions thus far described, that glass compositions in shade 5.3 for specimens of the compositions having a thickness of approximately 3 mm. can be obtained from batch compositions which include constituents in quantities within the following ranges:

Percent by weight
Silica, $SiO_2$ _____ From 55.7 to 72.14
Sodium oxide, $Na_2O$ _____ From 0 to 15.75
Potassium oxide, $K_2O$ _____ From 0 to 15.75
Calcium oxide, CaO _____ From 6.43 to 13.7
Titanium dioxide, $TiO_2$ _____ From 0 to 1.90
Arsenic trioxide, $As_2O_3$, and/or antimony trioxide, $Sb_2O_3$ ___ From 0.5 to 1.0
Copper oxide, CuO _____ From 5.00 to 5.55
Cobalt oxide, $Co_2O_3$ _____ From 0.015 to 0.02 wherein the combined content of $Na_2O$ and $K_2O$ equals at least 12 percent by weight.

Similarly, it can be seen from the batch compositions, thus far described, that glass compositions in shade 12.5 for specimens of the compositions having a thickness of approximately 3 mm can be obtained from batch compositions which include constituents in quantities within the following ranges:

Percent by weight
Silica, $SiO_2$ _____ From 52.26 to 71.30
Sodium oxide, $Na_2O$ _____ From 0 to 12.85
Potassium oxide, $K_2O$ _____ From 0 to 12.85
Calcium oxide, CaO _____ From 6.52 to 13.50
Titanium dioxide, $TiO_2$ _____ From 0 to 1.90
Arsenic trioxide, $As_2O_3$, and/or antimony trioxide, $Sb_2O_3$ ___ From 0.5 to 1.0
Copper oxide, CuO _____ From 8.50 to 9.48
Cobalt oxide, $Co_2O_3$ _____ From 0.15 to 0.20 wherein the combined content of $Na_2O$ and $K_2O$ equals at least 12 percent by weight.

The chemical analyses of glasses embodying a range of ingredients resulting in a 5.3 shade glass up to 12.5 shade glass for 3 mm. thickness resulting from batches B and F are as follows:

Percent by weight
Silica, $SiO_2$ _____ From 62.34 to 65.22
Iron plus aluminum oxides, $R_2O_3$ _ From 0.82 to 1.26
Calcium oxide, CaO _____ From 11.43 to 12.07
Sodium oxide, $Na_2O$ _____ From 7.56 to 7.84
Potassium oxide, $K_2O$ _____ From 8.12 to 8.52
Arsenic as $As_2O_3$ _____ From 0.61 to 0.74
Copper oxide, CuO _____ From 5.48 to 9.30
Cobalt oxide, $Co_2O_3$ _____ From 0.018 to 0.197 wherein the iron oxide plus aluminum oxide are present as impurity contaminations.

The specific chemical analysis for 5.3 shade glass of a thickness of 3 mm. resulting from batch B is as follows:

Chemical Analysis B'

| | Percent by weight |
|---|---|
| Silica, $SiO_2$ | 65.22 |
| Iron plus aluminum oxides, $R_2O_3$ | 1.26 |
| Calcium oxide, CaO | 12.07 |
| Sodium oxide, $Na_2O$ | 7.84 |
| Potassium oxide, $K_2O$ | 8.12 |
| Arsenic as $As_2O_3$ | 0.61 |
| Copper oxide, CuO | 5.48 |
| Cobalt oxide, $Co_2O_3$ | 0.018 | wherein the iron oxide plus aluminum oxide are present as impurity contaminations.

The specific chemical analysis for 12.5 shade glass of a thickness of 3 mm. resulting from batch F is as follows:

Chemical Analysis F'

| | Percent by weight |
|---|---|
| Silica, $SiO_2$ | 62.34 |
| Iron plus aluminum oxides, $R_2O_3$ | 0.82 |
| Calcium oxide, CaO | 11.43 |
| Sodium oxide, $Na_2O$ | 7.56 |
| Potassium oxide, $K_2O$ | 8.52 |
| Arsenic as $As_2O_3$ | 0.74 |
| Copper oxide, CuO | 9.30 |
| Cobalt oxide, $Co_2O_3$ | 0.197 | wherein the iron oxide plus aluminum oxide are present as impurity contaminations.

In the chart of FIG. 1 of the drawings, the solid line illustrates the transmittance curve for the lighter shade 5.3 for a thickness of 3 mm. which curve as shown on the left has a relatively sharp cut-off in the ultra-violet region at about 400 millimicrons and has a relatively sharp peak of approximately 8.8% transmittance at the 485 millimicron wavelength. The cut-off in the visible part of the spectrum starts at about 590 millimicrons and is opaque throughout the remainder of the visible. In the scale at the right of FIG. 1 which, for ease of illustration, the percent scale has been greatly compressed, the glass at approximately 1.4 microns begins to transmit in the infra-red. The infra-red transmittance peaks at approximately 2.7 microns and said transmittance at said peak is approximately 59%. The glass then cuts off at 4.6 microns and is thereafter opaque.

In the chart of FIG. 2 of the drawings, the solid line illustrates the transmittance curve for the darker shade 12.5 but, for purposes of measurement, has been reduced to a thickness of approximately 1 mm., which curve as shown on the left has a relatively sharp cut-off in the ultra-violet region at about 400 millimicrons and has a relatively sharp peak of approximately 4.7% transmittance at the 485 millimicron wavelength. The cut-off in the visible part of the spectrum starts at about 585 millimicrons and is opaque throughout the remainder of the visible. In the scale at the right of FIG. 2 which, for ease of illustration, the percent scale has been greatly compressed, the glass at approximately 1.2 microns begins to transmit in the infra-red. The infra-red transmittance peaks at approximately 2.7 microns and said transmittance at said peak is approximately 69%. The glass then cuts off at 4.6 microns and is thereafter opaque. The reason for reducing the thickness of the glass is that if an attempt were made to measure a thickness of 3 mm. with existing instruments great difficulty would be encountered in obtaining any reading and said darker shades of glass, therefore, are reduced to a thickness of approximately 1 mm. for the purpose solely of measurement. It is to be understood however, that in use the 12.5 shade will have a thickness of 3 mm.

While it has been specified that the various shades of glasses peak at approximately 485 millimicrons, it is to be understood that a desirable peak range may lie between 480 and 490 millimicrons. However, the 485 millimicron peak is preferred.

It will be understood that the above-described glass compositions have been specified in conventional manner by reference to the calculated oxide compositions of the glass materials provided by this invention. The actual raw batch ingredients which may be employed for achieving the described compositions can be selected according to their cost, availability, convenience, etc. in conventional manner.

In following the teaching of applicants' invention, one first weighs out the ingredients of the batch using any commercially known scale in a conventional manner. The batch is mixed in a conventional manner using a conventional mixer such as that which is commercially known as a Patterson-Kelley Twin Shell Blender. The batch is then placed in a refractory clay pot, a mullite (an aluminum silicate pot) or the like and is heated to a temperature between 2600° F. and 2700° F. and is gradually held to approximately 2700° F.

As the glass batch is melted, additional batch material is added until the pot is filled, the length of time required for this being dependent upon the size of the pot. For a pot holding a batch of 100 lbs., about five to seven hours will be required for filling the pot. Thereafter the batch is allowed to fine (for removal of bubbles) at about 2700° F. for a period of three to four hours for a 100 lb. batch. Then the temperature of the melted glass and of the pot are gradually reduced to casting temperature of the glass at around 2000° F. to 2100° F. the glass being stirred as the temperature thereof is reduced. The glass is then annealed at approximately 1100° F. for a period of about four hours depending upon the size and shape of the glass casting formed from the glass. The temperature of the cast glass is then gradually reduced to room temperature over a period of approximately twenty-four hours.

Melting of the glass batch is preferably accomplished in a neutral or mildly oxidizing atmosphere such as would be normally provided without specific control where the glass batch is melted in a conventional electric furnace. Such neutral or mildly oxidizing conditions would also normally result from use of conventional raw batch ingredients.

In forming welding plates with the glasses of the present invention and to obviate possible undesirable radiations of the infra-red while retaining the desired absorptive characteristics of the glass, a thin metallic coating preferably of gold is placed on the side surface of the glasses which is to be the front thereof when in use or side away from the eyes. Gold is preferred as it peaks in the visible region of the spectrum at very nearly the same wavelength as do the glasses of the present invention and brings about little, if any, appreciable shift in said peaking. If the peak transmittance should be shifted to the left of the peaking set forth herein, the undesirable blue haze surrounding the work, previously referred to, becomes apparent and if said peak transmittance is shifted to the right, the undesirable yellow flare, previously referred to, becomes apparent. The ideal peak transmittance, therefore, is as set forth herein and is in the blue-green region.

The thickness of the gold is controlled so as to add from ¾ to approximately 1¾ shades to the glass. This is done by measuring the transmittance of the gold through a clear piece of glass to produce a master curve which represents shade versus transmittance and allows for the control of the amount of shade being added to the glasses of the invention as the layer of gold is being applied and by simultaneously comparing the shade change with the master curve.

The above shades of glass are carefully controlled so that when said relatively thin coating of gold of controlled thickness is placed thereon, the shade numbers of the resultant plates or articles will be increased by approximately 1.5 shade numbers and will, therefore, be within the established commercial range of shades from 6 to 14.

It is further pointed out that glasses resulting from the batches as given in the above tables will all peak in the visible region of the spectrum at approximately 485 millimicrons and the related proportions of ingredients given therein are so controlled as to give the proper shades of glasses when of a thickness of approximately 3 mm.

It has been found by actual test that the glasses resulting from the above batches not only have improved transmittance characteristics but are particularly durable and stable to chemical attack and to conditions of high temperatures and high humidity and are, therefore, more desirable for use in the fabrication of welding plates of the character described.

It is to be understood that certain of the ingredients may be varied in accordance with teachings set forth above in connection with certain of the compositions as, for example, if darker shades are established.

From the foregoing description, it will be apparent that simple, efficient and economical means and methods have been provided for obtaining all of the objects and advantages of the invention.

Having described our invention, we claim:

1. Glass compositions of the character described ranging in shades from 5.3 to 12.5 for specimens of said compositions having a thickness of approximately 3 mm., each of said compositions being adapted for peak transmission for light of approximately 485 millimicrons wavelength and resulting from the combining of:

| | Percent by weight |
|---|---|
| Silica, $SiO_2$ | From 52.2 to 72.5 |
| Sodium oxide, $Na_2O$ | From 0 to 16 |
| Potassium oxide, $K_2O$ | From 0 to 16 |
| Calcium oxide, $CaO$ | From 6.4 to 13.7 |
| Arsenic trioxide, $As_2O_3$ | From 0 to 1.0 |
| Antimony trioxide, $Sb_2O_3$ | From 0 to 1.0 |
| Titanium dioxide, $TiO_2$ | From 0 to 2.0 |
| Copper oxide, $CuO$ | From 5.0 to 9.5 |
| Cobalt oxide, $Co_2O_3$ | From 0.015 to 0.20 | wherein the combined content of $As_2O_3$ and $Sb_2O_3$ in the compositions is between 0.5 and 1.0 percent by weight, wherein the combined content of $Na_2O$ and $K_2O$ in the compositions equals at least 12.0 percent by weight, wherein the recited ingredients make up substantially 100 percent of said compositions, and wherein the $CuO$ and $Co_2O_3$ contents of the compositions are selected from FIG. 3 of the drawings in accordance with the desired shades of said specimens of the compositions and in accordance with the ratio of the $Na_2O$ content to the $K_2O$ content of the compositions.

2. Glass compositions of the character described ranging in shades from 5.3 to 12.5 for specimens of said compositions having a thickness of approximately 3 mm., each of said compositions being adapted for peak transmission for light of approximately 485 millimicrons wavelength and resulting from the combining of:

| | Percent by weight |
|---|---|
| Silica, $SiO_2$ | From 52.26 to 71.59 |
| Sodium oxide, $Na_2O$ | From 6.30 to 11.95 |
| Potassium oxide, $K_2O$ | From 6.55 to 12.42 |
| Calcium oxide, $CaO$ | From 6.43 to 13.70 |
| Arsenic trioxide, $As_2O_3$ | From 0 to 0.66 |
| Antimony trioxide, $Sb_2O_3$ | From 0 to 0.66 |
| Titanium dioxide, $TiO_2$ | From 0 to 1.90 |
| Copper oxide, $CuO$ | From 5.55 to 9.48 |
| Cobalt oxide, $Co_2O_3$ | From 0.02 to 0.20 | wherein the combined content of $As_2O_3$ and $Sb_2O_3$ in the compositions is between 0.54 and 0.55 percent by weight, wherein the combined content of $Na_2O$ and $K_2O$ in the compositions equals at least 12.0 percent by weight with 49 percent thereof being composed of $Na_2O$ and 51 percent thereof being composed of $K_2O$, wherein the recited ingredients make up substantially 100 percent of said compositions, and wherein the $CuO$ and $Co_2O_3$ contents of the compositions are selected from curve $a$ of FIG. 3 of the drawings in accordance with the desired shades of said specimens of the compositions.

3. Glass compositions of the character described ranging in shades from 5.3 to 12.5 for specimens of said compositions having a thickness of approximately 3 mm., each of said compositions being adapted for peak transmission for light of approximately 485 millimicrons wavelengths and resulting from the combining of:

| | Percent by weight |
|---|---|
| Silica, $SiO_2$ | From 70.00 to 71.80 |
| Sodium oxide, $Na_2O$ | From 12.85 to 15.75 |
| Calcium oxide, $CaO$ | From 6.43 to 8.97 |
| Arsenic trioxide, $As_2O_3$ | From 0 to 0.66 |
| Antimony trioxide, $Sb_2O_3$ | From 0 to 0.66 |
| Copper oxide, $CuO$ | From 5.50 to 9.48 |
| Cobalt oxide, $Co_2O_3$ | From 0.015 to 0.15 | wherein the combined content of $As_2O_3$ and $Sb_2O_3$ in the compositions is between 0.63 and 0.66 percent by weight wherein the recited ingredients make up substantially 100 percent of said compositions, and wherein the $CuO$ and $Co_2O_3$ contents of the compositions are selected from curve $b$ of FIG. 3 of the drawings in accordance with the desired shades of said specimens of the compositions.

4. Glass compositions of the character described ranging in shades from 5.3 to 12.5 for specimens of said compositions having a thickness of approximately 3 mm., each of said compositions being adapted for peak transmission for light of approximately 485 millimicrons wavelength and resulting from the combining of:

| | Percent by weight |
|---|---|
| Silica, $SiO_2$ | From 70.00 to 72.14 |
| Potassium oxide, $K_2O$ | From 12.85 to 15.75 |
| Calcium oxide, $CaO$ | From 6.43 to 8.97 |
| Arsenic trioxide, $As_2O_3$ | From 0 to 0.66 |
| Antimony trioxide, $Sb_2O_3$ | From 0 to 0.66 |
| Copper oxide, $CuO$ | From 5.00 to 8.50 |
| Cobalt oxide, $Co_2O_3$ | From 0.02 to 0.20 | wherein the combined content of $As_2O_3$ and $Sb_2O_3$ in the compositions is between 0.63 and 0.66 percent by weight wherein the recited ingredients make up substantially 100 percent of said compositions, and wherein the $CuO$ and $Co_2O_3$ contents of the compositions are selected from curve $c$ of FIG. 3 of the drawings in accordance with the desired shades of said specimens of the compositions.

5. Glass compositions of the character described of shade 5.3 for specimens of the compositions having a thickness of approximately 3 mm., each of said compositions being adapted for peak transmission for light of approximately 485 millimicrons wavelength and resulting from the combining of:

| | Percent by weight |
|---|---|
| Silica, $SiO_2$ | From 55.7 to 72.14 |
| Sodium oxide, $Na_2O$ | From 0 to 15.75 |
| Potassium oxide, $K_2O$ | From 0 to 15.75 |
| Calcium oxide, $CaO$ | From 6.43 to 13.7 |
| Titanium dioxide, $TiO_2$ | From 0 to 1.90 |
| Arsenic trioxide, $As_2O_3$ | From 0 to 1.0 |
| Antimony trioxide, $Sb_2O_3$ | From 0 to 1.0 |
| Copper oxide, $CuO$ | From 5.00 to 5.55 |
| Cobalt oxide, $Co_2O_3$ | From 0.015 to 0.02 | wherein the combined content of $As_2O_3$ and $Sb_2O_3$ in the compositions is between 0.5 and 1.0 percent by weight, wherein the combined content of $Na_2O$ and $K_2O$ in the compositions equals at least 12.0 percent by weight, wherein the recited ingredients make up substantially 100 percent of said compositions, and wherein the $CuO$ and $Co_2O_3$ contents of the compositions are selected from FIG. 3 of the drawings in accordance with the ratio of the $Na_2O$ content to the $K_2O$ content of the compositions.

6. Glass compositions of the character described of shade 12.5 for specimens of the compositions having a thickness of approximately 3 mm., each of said compositions being adapted for peak transmission for light of approximately 485 millimicrons wavelength and resulting from the combining of:

| | Percent by weight |
|---|---|
| Silica, $SiO_2$ | From 52.26 to 71.30 |
| Sodium oxide, $Na_2O$ | From 0 to 12.85 |
| Potassium oxide, $K_2O$ | From 0 to 12.85 |
| Calcium oxide, CaO | From 6.52 to 13.50 |
| Titanium dioxide, $TiO_2$ | From 0 to 1.90 |
| Arsenic trioxide, $As_2O_3$ | From 0 to 1.0 |
| Antimony trioxide, $Sb_2O_3$ | From 0 to 1.0 |
| Copper oxide, CuO | From 8.50 to 9.48 |
| Cobalt oxide, $Co_2O_3$ | From 0.15 to 0.20 | wherein the combined content of $As_2O_3$ and $Sb_2O_3$ in the compositions is between 0.5 and 1.0 percent by weight, wherein the combined content of $Na_2O$ and $K_2O$ in the compositions equals at least 12.0 percent by weight, wherein the recited ingredients make up substantially 100 percent of said compositions, and wherein the CuO and $Co_2O_3$ contents of the compositions are selected from FIG. 3 of the drawings in accordance with the ratio of the $Na_2O$ content of the $K_2O$ content of the compositions.

7. A glass article of shade 5.3 for 3 mm. thickness whose chemical analysis is substantially as follows:

| | Percent by weight |
|---|---|
| Silica, $SiO_2$ | 65.22 |
| Iron plus aluminum oxides, $R_2O_3$ | 1.26 |
| Calcium oxide, CaO | 12.07 |
| Sodium oxide, $Na_2O$ | 7.84 |
| Potassium oxide, $K_2O$ | 8.12 |
| Arsenic as $As_2O_3$ | 0.61 |
| Copper oxide, CuO | 5.48 |
| Cobalt oxide, $Co_2O_3$ | 0.018 | wherein the iron oxide plus aluminum oxide are present as impurity contaminations.

8. A glass article of shade 12.5 for 3 mm. thickness whose chemical analysis is substantially as follows:

| | Percent by weight |
|---|---|
| Silica, $SiO_2$ | 62.34 |
| Iron plus aluminum oxides, $R_2O_3$ | 0.82 |
| Calcium oxide, CaO | 11.43 |
| Sodium oxide, $Na_2O$ | 7.56 |
| Potassium oxide, $K_2O$ | 8.52 |
| Arsenic as $As_2O_3$ | 0.74 |
| Copper oxide, CuO | 9.30 |
| Cobalt oxide, $Co_2O_3$ | 0.197 | wherein the iron oxide plus aluminum oxide are present as impurity contaminations.

9. A glass article comprising a glass member of a composition having ingredients within the ranges set forth in claim 1, and a thin coating of gold on a side surface of the member of a thickness sufficient to add approximately 1.5 shade to the glass member.

10. A glass article comprising a glass member of a composition having ingredients within the ranges set forth in claim 2, and a thin coating of gold on a side surface of the member of a thickness sufficient to add approximately 1.5 shade to the glass member.

11. A glass article comprising a glass member of a composition having ingredients within the ranges set forth in claim 3, and a thin coating of gold on a side surface of the member of a thickness sufficient to add approximately 1.5 shade to the glass member.

12. A glass article comprising a glass member of a composition having ingredients within the ranges set forth in claim 4, and a thin coating of gold on a side surface of the member of a thickness sufficient to add approximately 1.5 shade to the glass member.

13. A glass article comprising a glass member of a composition having ingredients within the ranges set forth in claim 5, and a thin coating of gold on a side surface of the member of a thickness sufficient to add approximately 1.5 shade to the glass member.

14. A glass article comprising a glass member of a composition having ingredients within the ranges set forth in claim 6, and a thin coating of gold on a side surface of the member of a thickness sufficient to add approximately 1.5 shade to the glass member.

15. A glass article comprising a glass member of a composition having ingredients as set forth in claim 7, and a thin coating of gold on a side surface of the member of a thickness sufficient to add approximately 1.5 shade to the glass member.

16. A glass article comprising a glass member of a composition having ingredients as set forth in claim 8, and a thin coating of gold on a side surface of the member of a thickness sufficient to add approximately 1.5 shade to the glass member.

References Cited in the file of this patent

UNITED STATES PATENTS

| 1,331,937 | Lukiesh et al. | Feb. 24, 1920 |
| 2,693,422 | Duncan et al. | Nov. 2, 1954 |
| 2,854,349 | Dreyfus et al. | Sept. 30, 1958 |
| 2,913,350 | Upton | Nov. 17, 1959 |

OTHER REFERENCES

Weyl: "Colored Glasses," pub. 1959, by Dawson's of Pall Mall, London, pages 165–167.